US008549442B2

(12) United States Patent
Marks et al.

(10) Patent No.: US 8,549,442 B2
(45) Date of Patent: Oct. 1, 2013

(54) VOICE AND VIDEO CONTROL OF INTERACTIVE ELECTRONICALLY SIMULATED ENVIRONMENT

(75) Inventors: Richard L. Marks, Foster City, CA (US); Ruxin Chen, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1224 days.

(21) Appl. No.: 11/302,516

(22) Filed: Dec. 12, 2005

(65) Prior Publication Data

US 2007/0139443 A1 Jun. 21, 2007

(51) Int. Cl.
*G06F 3/033* (2013.01)

(52) U.S. Cl.
USPC ............................ 715/863; 715/853; 715/838

(58) Field of Classification Search
USPC ................ 715/863, 853, 706, 709, 730, 866, 715/784, 786, 835, 839, 838
See application file for complete search history.

(56) References Cited

U.S. PATENT DOCUMENTS

| | | | |
|---|---|---|---|
| 6,147,678 A | 11/2000 | Kumar et al. | |
| 6,222,465 B1 | 4/2001 | Kumar et al. | |
| 6,690,391 B1 | 2/2004 | Kim et al. | 715/720 |
| 6,907,422 B1 * | 6/2005 | Predovic | 707/999.002 |
| 7,039,879 B2 * | 5/2006 | Bergsten et al. | 715/853 |
| 7,134,080 B2 * | 11/2006 | Kjeldsen et al. | 715/730 |
| 7,225,414 B1 * | 5/2007 | Sharma et al. | 715/863 |
| 2003/0001907 A1 | 1/2003 | Bergsten et al. | 715/853 |
| 2003/0095149 A1 | 5/2003 | Fredriksson et al. | 715/797 |
| 2003/0132913 A1 | 7/2003 | Issinski | |
| 2003/0169302 A1 | 9/2003 | Davidsson et al. | 715/810 |
| 2004/0087366 A1 * | 5/2004 | Shum et al. | 463/36 |
| 2004/0189720 A1 * | 9/2004 | Wilson et al. | 345/863 |
| 2004/0212586 A1 | 10/2004 | Denny, III | 345/156 |
| 2005/0071782 A1 * | 3/2005 | Barrett et al. | 715/838 |
| 2005/0132420 A1 | 6/2005 | Howard et al. | 725/9 |
| 2005/0257166 A1 | 11/2005 | Tu | 715/787 |
| 2007/0074212 A1 | 3/2007 | Bates et al. | 718/100 |

FOREIGN PATENT DOCUMENTS

| | | |
|---|---|---|
| GB | 2 398 690 A | 8/2004 |
| GB | 2 398 691 A | 8/2004 |
| JP | 9185456 | 7/1997 |
| JP | 2000075991 | 3/2000 |
| JP | 2001307107 | 11/2001 |
| JP | 2002-287950 | 10/2002 |
| JP | 2002-543487 | 12/2002 |

(Continued)

OTHER PUBLICATIONS

Webopedia (write back cache).*

(Continued)

*Primary Examiner* — Omar Abdul-Ali
*Assistant Examiner* — Sherrod Keaton
(74) *Attorney, Agent, or Firm* — Joshua D. Isenberg; JDI Patent

(57) ABSTRACT

A method of moving objects in a graphical user interface, includes obtaining a video image of a user of the interface; displaying the video image on a display such that the video image is superposed with one or more objects displayed on the display; and moving one or more objects displayed on the display based on recognition of motions of the video image of the user. Recognition of motions of the video image may include recognition of motions of an image of the user's hand.

51 Claims, 10 Drawing Sheets

(56) References Cited

FOREIGN PATENT DOCUMENTS

| WO | 9934276 A2 | 7/1999 |
|----|------------|--------|
| WO | WO 00/65429 | 11/2000 |
| WO | 0219310 A1 | 3/2002 |
| WO | WO 03/003180 | 1/2003 |
| WO | WO 03/021916 | 3/2003 |
| WO | 2005008626 A1 | 1/2005 |

OTHER PUBLICATIONS

Crowley et al., "Things That See." Mar. 2000 [online], Communications of the ACM Mar. 2000/ vol. 43 No. 3 [Retrieved on Aug. 27, 2007]. Retrieved from the internet: <http://www.prima.imag.fr/publi/things-that-see.pdf>.

International Search Report and Written Opinion of the International Searching Authority of international patent application No. PCT/US06/60851.

Japanese Office Action issued for Japanese Patent Application No. 2008-545896 dated May 17, 2011.

Extended European Search Report dated Jul. 4, 2012 issued for European Patent Application No. 06846294.4.

Japanese Office Action issued for Japanese Patent Application No. 2008-545896 dated Feb. 28, 2012.

Japanese Office Action issued for Japanese Patent Application No. 2008-545896 dated Oct. 11, 2011.

* cited by examiner

DATABASE OF
MULTIMEDIA ITEMS

VOICE AND VIDEO CONTROL OF INTERACTIVE ELECTRONICALLY SIMULATED ENVIRONMENT

CROSS-REFERENCE TO RELATED APPLICATIONS

This application is related to U.S. patent application Ser. No. 10/874,863, entitled "Fast Scrolling in A Graphical User Interface" filed Jun. 22, 2004, which claims the benefit of priority of U.S. Provisional Patent Application Ser. No. 60/570,266, entitled "Fast Scrolling in A Graphical User Interface", filed May 11, 2004. The disclosure of application Ser. Nos. 10/874,863 and 60/570,266 are hereby incorporated by reference.

BACKGROUND

Graphical user interfaces simplify end user interaction with computer programs and are designed such that knowledge of specific commands and/or combinations of keystrokes is not required to efficiently and effectively use the computer program. Thus, a function can be carried out by the computer application, which owns the graphical user interface (GUI), by selecting or clicking with a mouse, a particular selection available in a GUI.

Graphical user interfaces often attempt to provide as much information as possible to a user. However, space is limited by the size of a display device that a user utilizes, such as a monitor, and/or by the size of an element within the GUI in which information is displayed to the user. Accordingly, techniques have been developed to convey to the end user that additional information logically exists beyond the edges of a window or other elements of the GUI being displayed at any given time. The techniques include a GUI action referred to as "scrolling" in which the displayed information is scrolled to show additional information previously not displayed. In computer terms, scrolling is the ability to move the element, displayed within the GUI, left and right or up and down on the display in order to view the element that cannot be included within a single display image.

In a typical window-based GUI system, a group of visually distinct display objects are provided on the display screen, and are commonly referred to as "icons". Each of the icons represents a function or object, and may be configured as a pointer or symbol connecting the function or object to a file or contents. Presenting the file or contents to a user with a computer using multiple windows on a display device with a GUI is known in the art. The technique of using a pointing device, such as a mouse or a trackball to select data within the file before a function is applied to the data is also known in the art. Further, the method of using the pointing device to provide graphical input to the window is also well known.

However, as discussed above, these techniques present various difficulties including the fact that the information contained in the file is greater than what can be displayed in the window at one time. Similarly, the user may want to provide graphical input that exceeds the window size. Thus, some method must be employed to allow the user to use the pointing device to select or input information that exceeds the window boundaries.

One possible solution is to enlarge the window. However, this is useful only when the amount of data is less than the available window size. Another solution is to provide a visual device known as a scroll bar, which permits the user to navigate beyond the edges of the window boundaries.

These prior art solutions, however, are often limited and may not fully utilize the capabilities of the GUI system. For example, in situations where a sequence of images is to be scrolled, the GUI system may be incapable of processing the images fast enough to scroll and visually smoothly display all the images. In addition, it is desirable to provide a user interface that may be configured with a pointing device and method that enables a user to control the interface without reliance on a joystick, mouse or trackball for user interaction therewith.

SUMMARY

The present invention provides method and apparatus for moving objects in a graphical user interface. In one implementation, a method of moving objects in a graphical user interface, includes obtaining a video image of a user of the interface; displaying the video image on a display such that the video image is superposed with one or more objects displayed on the display; and moving one or more objects displayed on the display based on recognition of motions of the video image of the user. Recognition of motions of the video image may include recognition of motions of an image of the user's hand.

Moving one or more objects may include selecting, dragging, manipulating an icon, receiving a command to drag, manipulate, scroll and/or select one or more contents icons of the plurality of contents icons displayed on display; and retrieving an appropriate number of additional contents icons from a contents icon database to provide a scrolled display in the graphical user interface. The contents icon database may be divided into a plurality of entries, each entry of the plurality of entries including at least data for a contents icon of the plurality of contents icons and a link to a contents file, each entry of the database is configured to be fixed in size so that the data for the contents icon can be quickly accessed, and the contents icon can be scrolled in the graphical user interface at a relatively high speed.

According to another embodiment, a graphical user interface accessible to a user suitable for receiving user-supplied inputs that facilitate selecting a multimedia icon may include a medium icon array arranged in a first direction, and including a plurality of user selectable medium icons; a contents icon array arranged in a second direction, and including a plurality of user selectable contents icons, a real-time video image of a user of the graphical user interface, wherein the medium icon array and the contents icon array superposed over the image of the user, wherein the icons from the medium icon array and/or contents icon array are selected and moved based on motions of the image of the user. The plurality of user selectable contents icons may be accessed from a database divided into a plurality of entries, each entry configured to be fixed in size and including at least data for each contents icon of the plurality of user selectable contents icons, such that the contents icons can be quickly accessed and scrolled in the graphical user interface at a relatively high speed.

According to another embodiment, a computer program, stored in a tangible storage medium, for moving objects in a graphical user interface may include executable instructions that cause a computer to obtain a video image of a user of the interface; display the video image on a display; and based on recognition of motions of the video image of the user, moving one or more objects displayed in the graphical user interface.

According to another embodiment, a multimedia processing apparatus may include a video image capture device adapted to capture a real-time video image of a user of a graphical user interface; a display adapted to show the medium icon array and the contents icon array superposed over the image of the user; and a display control that allows the user to move objects shown in the graphical user interface based on motions of the image of the user.

According to another embodiment, a method of selecting a category of file types (including but not limited to music, movies and games) in a graphical user interface may include receiving a voice command directed at the category and whereby the category is selected and displayed according to the scheme of the present invention.

According to another embodiment, a method of selecting an individual file (including but not limited to a song, movie or saved game files) in a category of file types (including but not limited to music, movies and games) in a graphical user interface may include receiving a voice command directed at the song movie or saved game which is selected or activated according to the scheme of the present invention.

According to another embodiment, a method of scrolling in a graphical user interface may include receiving a voice command to scroll a plurality of contents icons displayed in the graphical user interface; and retrieving an appropriate number of additional contents icons from a contents icon database to provide a scrolled display in the graphical user interface. The contents icon database may be divided into a plurality of entries, each entry of the plurality of entries including at least data for a contents icon of the plurality of contents icons and a link to a contents file, each entry of the database is configured to be fixed in size so that the data for the contents icon can be quickly accessed, and the contents icon can be scrolled in the graphical user interface at a relatively high speed.

According to yet another embodiment, a multimedia processing apparatus, may include an audio signal capture device; a memory configured as a contents icon database, including a plurality of entries including data for a plurality of contents icons and links to multimedia contents, wherein each entry of said plurality of entries is fixed in size such that the plurality of contents icons can be quickly accessed to allow the contents icons to be scrolled in a graphical user interface at a relatively high speed; and a processor coupled to the audio signal capture device, the processor being configured to load the plurality of contents icons to allow a user to scroll and select a particular contents icon from the plurality of contents icons based on one or more voice commands from a user.

DETAILED DESCRIPTION

As used in this disclosure, the term "contents" can refer to multimedia contents including moving images, audio, and text. The term "media" can refer to means for carrying or transmitting information, such as hard disks, optical disks, memory cards, and broadcast lines, and can represent data formats such as compression formats.

This disclosure describes systems and methods that enable high speed scrolling in a graphical user interface (GUI). In particular, various implementations of the high-speed scrolling systems and methods are described for multimedia apparatuses, such as game consoles and media controllers. However, the described systems and methods are applicable for other devices and apparatuses employing a GUI. These implementations also describe how icons representing multimedia contents can be scrolled at a relatively high speed while providing visually smooth display of the icons.

Figure 1:
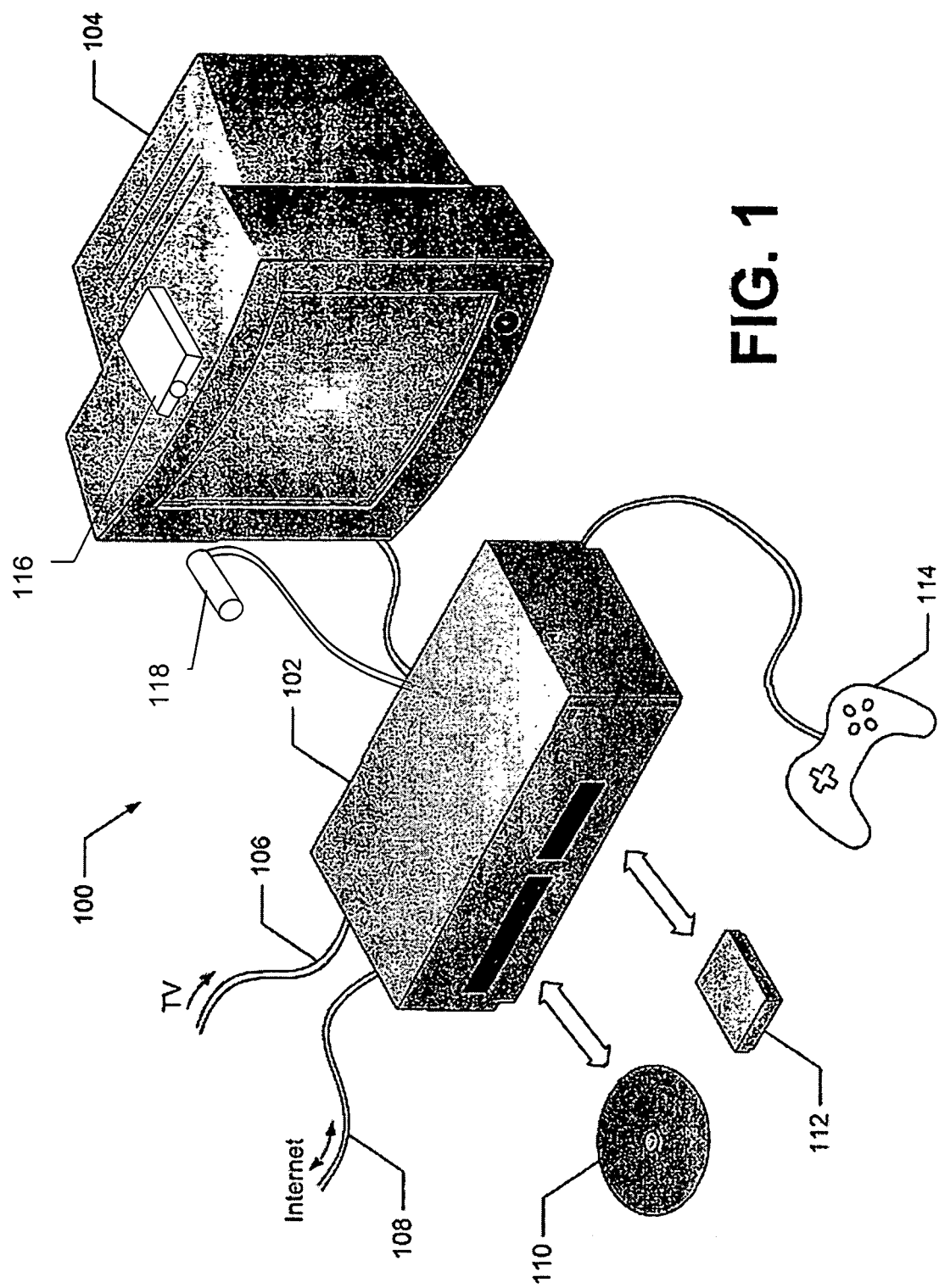
FIG. 1 shows one implementation of a multimedia processing system including a composite apparatus capable of processing a plurality of contents.

FIG. 1 shows one implementation of a multimedia processing system 100, which includes a composite apparatus capable of processing a plurality of contents, such as still images, moving images, music, broadcasts, and games, spread over a plurality of media. The processing of a plurality of contents includes presentation, recording, and other related tasks performed by the multimedia processing system 100. The multimedia processing system 100 includes a multimedia processing apparatus 102, a display 104 (e.g., a monitor or television), and a controller 114.

The multimedia processing apparatus 102 receives multimedia contents from various media sources, such as broadcast media, the Internet media, an optical disk 110, and a memory card 112. Contents from the broadcast media can be received through line 106, while contents from the Internet media can be received through line 108. The contents from the broadcast media and the Internet media can be recorded and stored by the multimedia processing apparatus 102. The received contents can also be used by various functions (e.g., a game) of the multimedia processing apparatus 102.

The received multimedia contents are displayed on the display 104. The controller 114 allows the user to input various instructions related to multimedia processing, and to control functions of the multimedia processing apparatus 102.

The system 100 may include audio and video inputs to facilitate user interaction with images presented on the display 104. Such inputs may include a video image capture device 116, such as a camera, and an audio signal capture device 118, such as a microphone. The video image capture device 116 may be placed on top of or integrated into the display 104 and coupled to the multimedia processing apparatus 102. It should be understood that the image capture device 116 may be placed in any other proximate location that will allow it to capture images that are located about in front of the display 104. Techniques for capturing these movements and interactions can vary, but examples of such techniques are described in United Kingdom Applications GB 0304024.3 (PCT/GB2004/000693) and GB 0304022.7 (PCT/GB2004/000703), each filed on Feb. 21, 2003, and each of which is hereby incorporated by reference. The image capture device 116 may be a digital camera, e.g. a USB 2.0 type camera.

Such a camera may have a field of view of about 75 degrees, and an f-stop of about 1.5 and be capable of capturing images at a frame rate of up to about 120 frames per second. By way of example, the video image capture device may be an Eye-Toy Camera available from Logitech of Fremont, Calif. Media processing apparatus 102 may be a game console, television, digital video recorder (DVR), cable set-top-box, home media server or consumer electronic device and including any device rendering itself subject to control of a user.

Figure 2A:
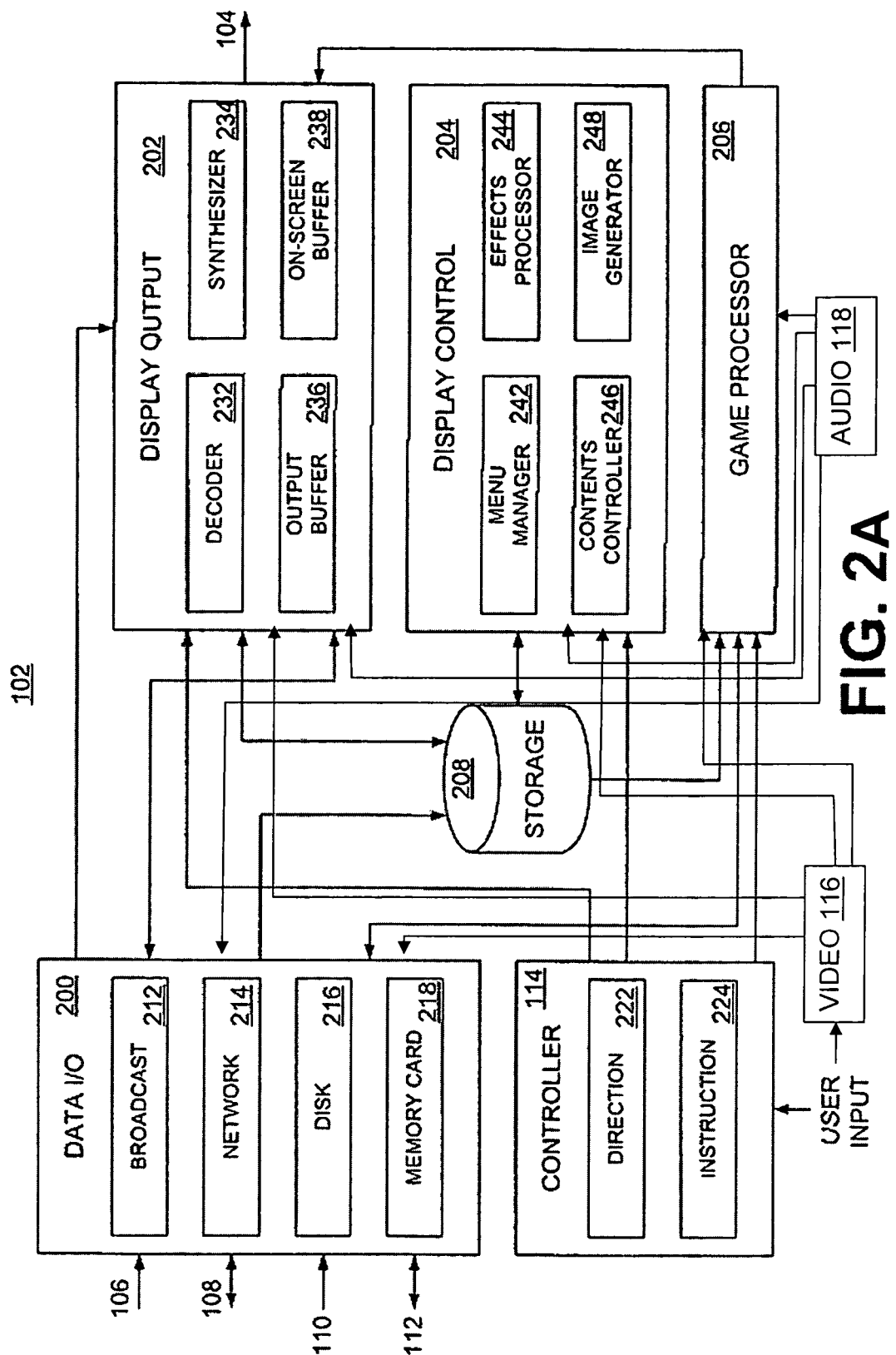
FIG. 2A is a functional block diagram showing one implementation of the multimedia processing apparatus.

FIG. 2A is a functional block diagram showing one implementation of the multimedia processing apparatus 102. In the illustrated implementation, the multimedia processing apparatus 102 includes the controller 114, video image capture device 116, audio signal capture device 118, a data input/output (I/O) unit 200, a display output unit 202, a display control unit 204, a storage unit 208, and a game processor 206. By way of example, the game processor 206 may be or may include a parallel processor such as a cell processor having a power processing unit (PPU) coupled to one or more synergistic processing units (SPU). Cell processors are described, e.g., in U.S. patent application Ser. No. 11/238,077, which is incorporated herein by reference. The multimedia processing apparatus 102 further includes programs and instructions for performing various functions, such as a data input function, a data retaining function, an image processing function, a rendering function, and other related functions.

The controller 114 includes a direction-determining unit 222 for determining one or a combination of four directions (i.e., an upward direction, a downward direction, a left direction, and a right direction) from the user input; and an instruction-determining unit 224 for determining an instruction from the user input. The instruction may include a command to present a multimedia content, to terminate the presentation, to invoke a menu screen, and to issue other related commands and/or instructions. Output of the controller 114, video image capture device 116 and audio signal capture device 118 is directed to the display output unit 202, the display control unit 204, and the game processor 206.

In the illustrated implementations of FIGS. 1 and 2A, the direction-determining unit 222 and the instruction-determining unit 224 are configured with a combination of buttons, circuits, and programs to actuate, sense, and determine the direction and the instruction. The buttons can include cross-shaped keys or joysticks. The button associated with an instruction for invoking a menu screen can be set in a toggle manner so that the menu screen can be toggled between a display mode and a non-display mode each time the button is pressed.

In one implementation, the direction-determining unit 222 may determine the diagonal movements of the button as a binary command in which the movement is ascertained to be in one of two directions. Thus, a diagonal movement between the up direction and the right direction can be ascertained to be in either the up or the right direction. In another implementation, the direction-determining unit 222 may determine the diagonal movements of the button as an analog command in which the movement is ascertained to be in a particular direction up to the accuracy of the measurement. Thus, a diagonal movement between the up direction and the right direction can be ascertained to be in a northwesterly direction. Directional movements may also be determined through interaction between the user, the video image capture device 116 and the display control 204 as described below.

The data I/O unit 200 includes a broadcast input unit 212 for inputting broadcast contents via the television line 106; a network communication unit 214 for inputting and outputting data such as web contents via the Internet line 108; a disk reading unit 216 for inputting data stored on a disk 110; and a memory card reading unit 218 for inputting and outputting data to/from a memory card 112. Output of the data I/O unit 200 is directed to the display output unit 202, the display control unit 204, the game processor 206, and the storage unit 208.

The display output unit 202 includes a decoder 232, a synthesizer 234, an output buffer 236, and an on-screen buffer 238. The decoder 232 decodes input data received from the data I/O unit 200 or the storage unit 208. Thus, the input data may include broadcast contents, movie, and music. The synthesizer 234 processes the decoded input data based on user direction/instruction received from the controller 114. The output of the synthesizer 234 is stored in the output buffer 236. The on-screen buffer 238 stores image data of the menu screen generated by the display control unit 204. The output of the display output unit 202 is transmitted to the display 104.

The display control unit 204 includes a menu manager 242, an effects processor 244, a contents controller 246, and an image generator 248. The menu manager 242 manages media items and multimedia contents received from the storage unit 208 and the data I/O unit 200, and shown on the menu screen. The effects processor 244 processes operation of icons and icon arrays on the menu screen. The effects processor 244 also manages various actions and effects to be displayed on the menu screen. The contents controller 246 controls processing of media items and multimedia contents, and handling of data from the data I/O unit, the storage unit 208, and the game processor 206. The image generator 248 operates to generate a menu screen including a medium icon array and a contents icon array.

The game processor 206 executes a game program using data read from the data I/O unit 200 or from the storage unit 208. The game processor 206 executes the game program based on user instructions received from the controller 114. The display data of the executed game program is transmitted to the display output unit 202.

Figure 2B:
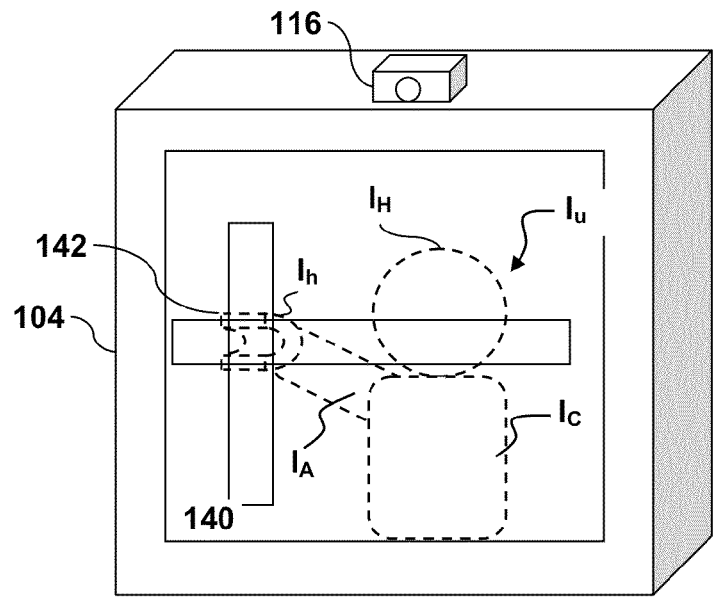
FIG. 2B shows an implementation of a multimedia processing system including voice and video control.
Figure 2B:
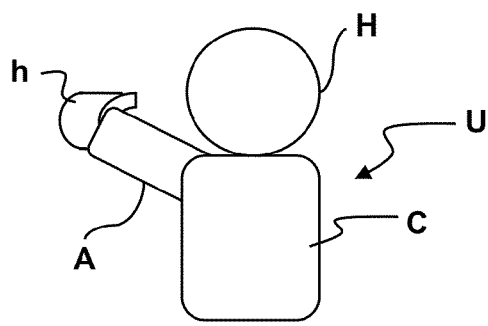

In embodiments of the present invention, signals from the video image capture device 116 and audio signal capture device 118 allow a user to interact with and manipulate images shown on the display 104. Specifically, embodiments of the invention allow a user to "grab" and "drag" objects from one location to another on the display 104. As shown in FIG. 2B, the video image capture device 116 points at and captures an image $I_U$ of a user U. The image $I_u$ may then be shown on the display 104 in the background of other images through a technique known as alpha blending.

The term "alpha blending" refers generally to a convex combination of two colors allowing for transparency effects in computer graphics. The value alpha in the color code may range from 0.0 to 1.0, where 0.0 represents a fully transparent color, and 1.0 represents a fully opaque color. By way of example, the value of the resulting color when color Value 1 is drawn over a background of color Value0 may be given by:

$$Value=Value0(1.0-alpha)+Value1(alpha)$$

The alpha component is used to blend to red, green and blue components equally, as in 32-bit RGBA, or, alternatively, there are three alpha values specified corresponding to each of the primary colors for spectral color filtering.

Once the user's hand h is recognized, the effects processor may correlate the directional displacement of the user's hand to directional input such as would normally be received from the controller 114. Optionally a magnitude of the displacement can control the input speed.

In particular embodiments, the image $I_u$ may include the user's head H and hand h. It is noted that to facilitate user interaction with the image $I_u$ the user's image $I_u$ may be presented on the screen as a mirror image of the user U. Thus, when the user U moves his hand h to the user's left, an image $I_h$ of the hand also moves to the user's left. The effectors processor 244 may be configured to recognize the user's hand h and recognizes changes in the aspect ratio (ratio of height to width) of the hand image $I_h$. These changes in aspect ratio may be used to signal the controller 114 that the user has "grabbed" or "clicked" on an object 140 presented on the display. The effects processor 244 can then move the selected object with the motion of the image $I_h$ of the user's hand h. In some embodiments, the user may hold a deformable "C"-shaped object 142 that is colored to be more readily recognizable to the effects processor 244 when interpreting the image from the video image capture device 116. Deformation of the object 142, referred to herein as a "clam" can provide a change in aspect ratio that is recognize as a command to "grab" or "click" an object in the display 104.

It is often desirable for the effects processor 244 to be able to recognize whether the user U is using his left or right hand to manipulate the object 140 on the display 104. For example, when manipulating an object on the display 104 with the left hand it is often desirable for object to appear to the left of the user's head H. In such a case the controller may also include software that recognizes the users hand h, head H, his arm A and his chest C by their corresponding images $I_h$, $I_H$, $I_A$, and $I_C$. With this information, the controller 114 can determine whether the user is using his left or right hand. For example, if the user's hand h is on the left side of his head H and his arm A is not across his chest, it can be determined that the user U is using his left hand. Similarly, if the user's hand h is on the left side of his head and his arm is across his chest, it can be determined that the user U is using his right hand.

Figure 2C:
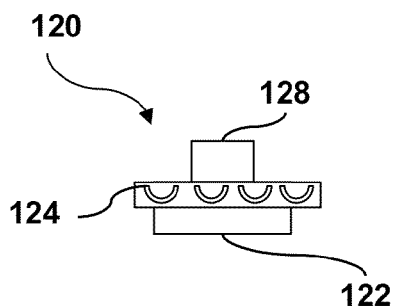
FIGS. 2C-2D illustrate an image capture device including an array of microphones for use with embodiments of the invention.
Figure 2D:
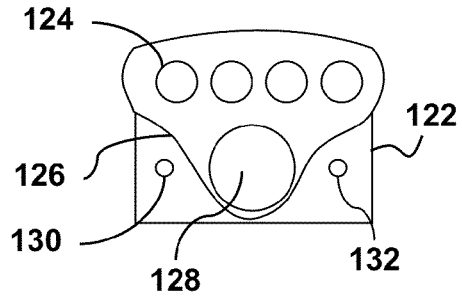

In certain embodiments of the invention the image capture device 116 and audio signal capture device 118 may be combined into the same piece of equipment. For example, FIGS. 2C-2D depict an image capture device 120 that may be used with the multimedia processing system 100. The device 120 includes an optical image capture device 122, e.g., a digital camera and one or more microphones 124. The microphones 124 may be arranged in an array and spaced apart from each other at known distances. By way of example and without loss of generality, the microphones 124 may be spaced in a linear array with adjacent microphones spaced about 2 centimeters apart center-to-center. Each microphone may have a resonant frequency of about 48 kilohertz.

In certain embodiments of the invention it is desirable for the microphones 124 to move with the image capture device 122. For example, the microphones 124 may be mounted to a frame 126 that keeps the microphones in a fixed positional relationship with respect to the image capture device, e.g., with respect to a lens 128. Although the microphones are depicted as being arrayed in a horizontal linear arrangement, they may alternatively be oriented vertically or diagonally or arrayed in a two-dimensional arrangement.

In some embodiments, the device 120 may include a visible LED 130 and an infrared LED 132. These may be used to illuminate objects in a field of view of the image capture device 122. To facilitate capture of infrared images, the lens 128 may include a so-called "day-night" coating that transmits visible light and selected frequencies of the infrared (e.g., frequencies at around 940 nm).

Figure 3A:
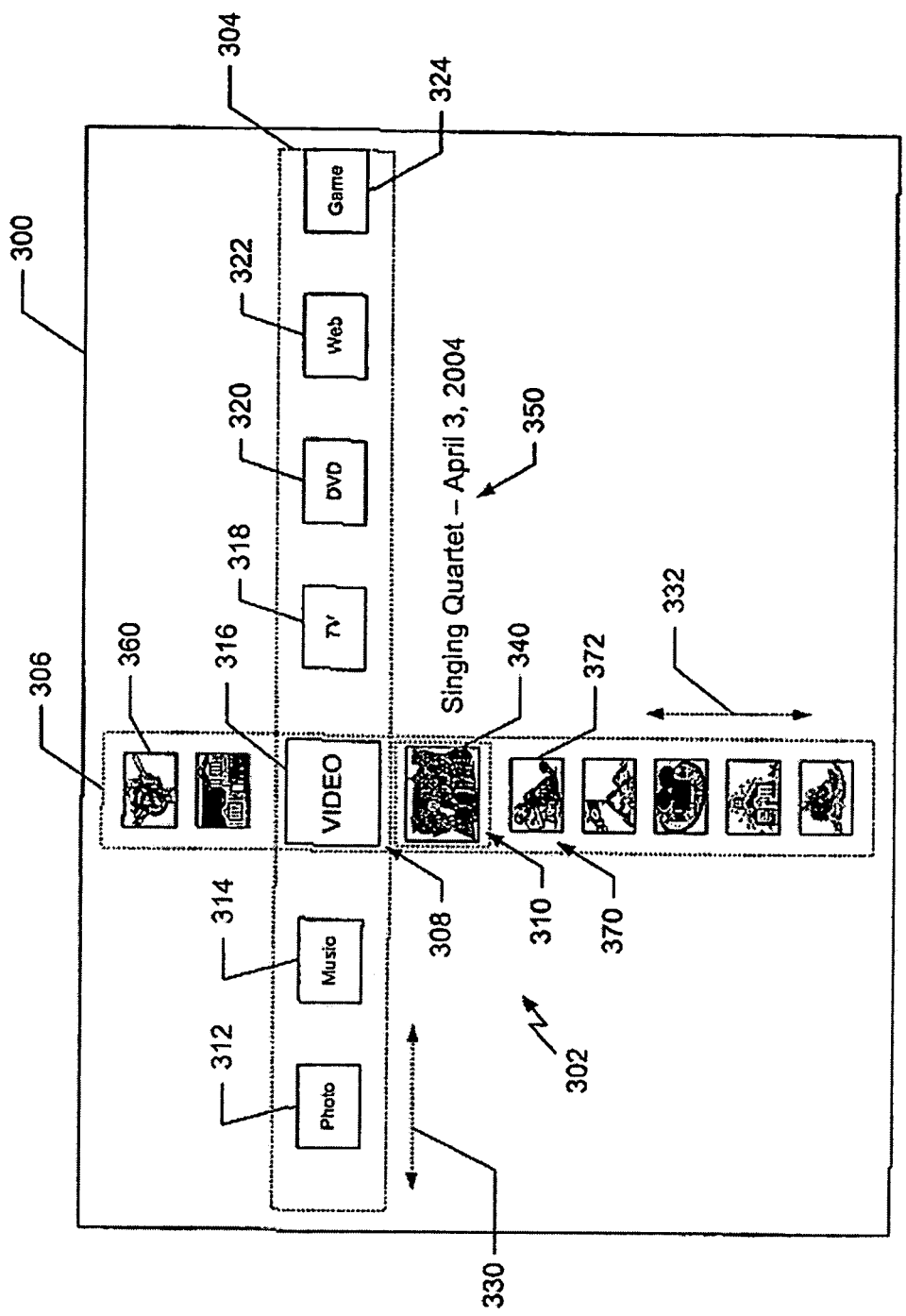
FIG. 3A illustrates a display of a menu screen generated by the multimedia processing apparatus.

Embodiments of the invention are particularly suited to manipulation of objects in a menu screen. FIG. 3A illustrates one implementation of a display 300 of a menu screen 302 generated by the multimedia processing apparatus 102. The display 300 illustrates the menu screen 302 in a two-dimensional array. In the illustrated implementation, the menu screen 302 is displayed as a cross shape. In other implementations, the menu screen can be displayed in any shape and in any number of dimensions.

The two-dimensional array includes a medium icon array 304 arranged in a horizontal direction, and a contents icon array 306 arranged in a vertical direction. In other implementations, the arrays 304, 306 can be arranged in different directions. Thus, the medium icon array 304 and the contents icon array 306 intersect at an intersection area 308 of the menu screen 302. The intersection area 308 may be located near the center of the menu screen 302 or proximate the left or right side. The medium icon array 304 includes a plurality of medium icons. The contents icon array 306 includes a plurality of contents icons. The icons can be provided by the apparatus, selected by a user, or retrieved from media.

By way of example, in FIG. 3A, the medium icon array 304 may include a photograph icon 312, a music icon 314, a moving image icon 316, a broadcast icon 318, an optical disk icon 320, a web icon 322, and a game icon 324. In other implementations, the medium icon array 304 can include other related icons, such as a streaming media icon or a network icon. These icons represent types of multimedia contents available for processing in the multimedia processing apparatus 102.

The medium icons 312-324 can be moved or scrolled across the menu screen 302 (e.g., see 330) using signals from the video image capture device 116 and/or audio signal capture device 118 to interact with and manipulate the medium icon array 304 as described above. For example, using the mirror image of the user, as described above with respect to FIG. 2B, a particular medium icon, for example, a video icon 316 in FIG. 3A, can be selected by moving the icon 316 into the intersection area 308 of the menu screen 302. The medium icon 316 is enlarged when the icon 316 is moved into the intersection area 308 indicating the selection of a type of multimedia contents, which in this case is video. In another implementation, the selection can be made by moving the icon to an area other than the center area or by moving a pointer over the icon and clicking a button to select the icon. In a further implementation, the color of the selected medium icon can be changed to a color different from those of other medium icons in the medium icon array. In another implementation, the selected medium icon can be made to flash so that the selected icon can be easily distinguished from other icons.

The effects processor 244 in the display control unit 204 manipulates the medium icon array 304 in the menu screen 302 by scrolling the medium icons in a horizontal direction in response to the movements of the user's hand. Since the medium icons 312-324 in the medium icon array 304 are organized in a circular database, every medium icon in the medium icon array 304 can be selected and displayed by the effects processor 244 by continuously scrolling in one direction. For example, although the photo icon 312 is to the left of the intersection area 308 of the menu screen, the icon 312 can be moved into the intersection area 308 by continuously scrolling left. Alternatively, the medium icons can be arranged in a linear list.

Figure 3B:
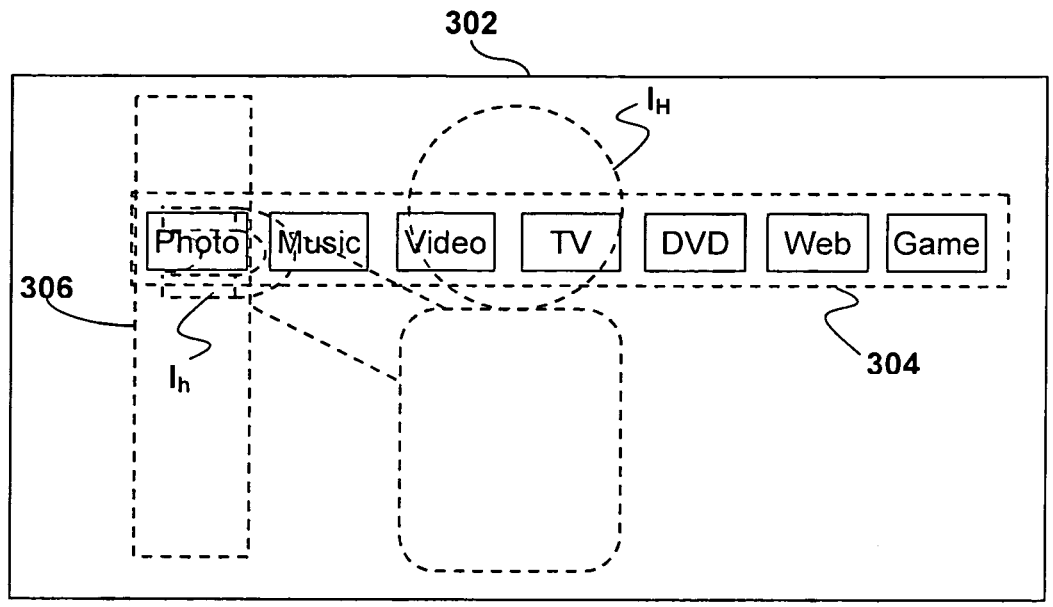
FIGS. 3B-3C illustrates a display of a menu screen generated by the multimedia processing apparatus using a video image capture device.
Figure 3C:
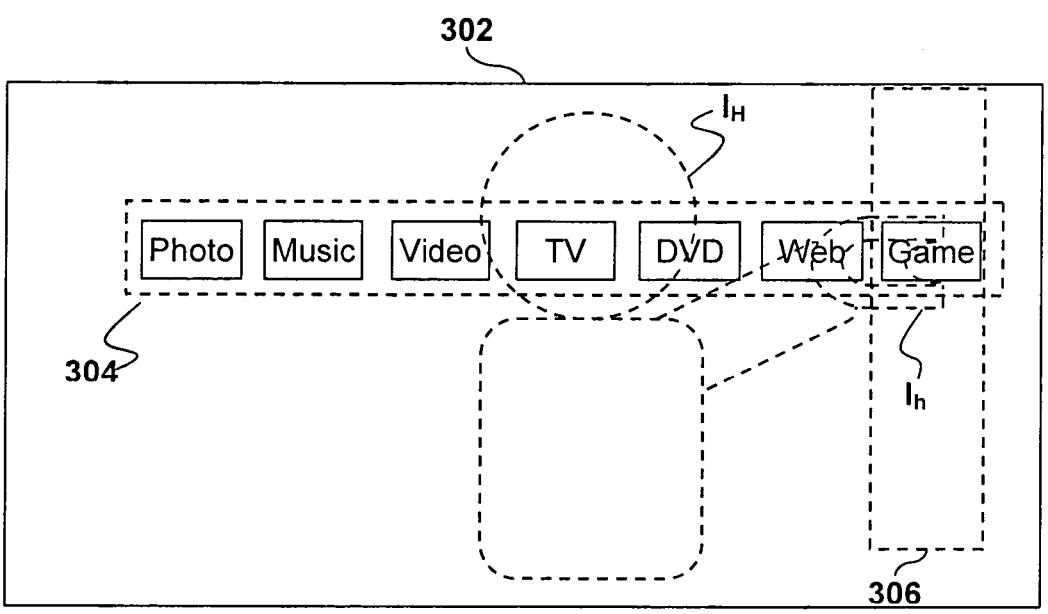

In certain embodiments of the invention, it may be desirable for the medium icon array 304 and the contents icon array 306 intersect near the left or right hand edge of the menu screen 302. This is particularly useful when manipulating the icons using through the video image capture device 116 as described above. In such a case, a user would prefer to have the intersection area 308 to be to the left or right of the image of the users head. For example as shown in FIG. 3B, if the user is manipulating the icons in his left hand the intersection area 308 appears to the left of the image of the user's head $I_H$ based on the position of the image of the user's hand $I_h$. In FIG. 3C, by contrast, the user manipulates the icons with his right hand as indicated by the image $I_h$ and the center area at the intersection of the medium icon array 304 and content icon array 306 appears to the right of the image user's head $I_H$. Note that in FIGS. 3B-3C the user's arm does not cross the user's chest. If the user's arm crosses the user's chest, the user probably does not want the intersection area to switch from one side of the menu screen 302 to the other. The effects processor 244 may be configured to recognize this situation and avoid switching the location of the intersection area 308 from one edge of the screen 302 to the other when the user's arm crosses the user's chest.

In alternative embodiments of the invention, a particular medium icon or content icon may be selected through the use of voice commands. A user may select one of the medium icons 312-324 by saying the name of the icon. For example, the user can select the video icon 316 by saying the word "video". The audio image capture device 118 receives the sound of the user's voice saying "video" and converts this to a signal that is transmitted to the multimedia processing apparatus 102. A speech recognition routine, e.g., within the contents controller 246 or effects processor 244, then interprets the signal and translates it into the appropriate command to the effects processor 244 to select the video icon 316. By way of example, a look-up table may be used to match the signal with the appropriate icon.

In addition to selecting icons, voice commands may be used to traverse the medium icon array 304 and/or content icon array using navigational words, such as up, down, next, previous, and the like. Furthermore, voice command may be used to help select the content icons. For example, the user may say keywords such as "love" when selecting songs from the music category and the display 300 will show all songs having the word "love" in the title or lyrics.

As described above, the effects processor 244 displays the medium icons with the same display parameters while the icons are being scrolled. However, when a medium icon is moved into and fixed in the intersection area 308 of the menu screen 302, the effects processor 244 may change the display parameters for easy viewing. The display parameters can include color, size, lightness, saturation, and/or hue. The display parameters can also include special effects, such as a flashing or blinking action.

In FIG. 3A, the video contents array is selected by moving the video icon 316 into the intersection area 308 of the menu screen 302. The selection of other medium icons displays contents icon arrays for other multimedia contents files. In FIG. 3, the selection triggers display of the video contents icon array 306, which includes thumbnail icons of video contents files stored in the storage unit 208. Thus, by moving a particular medium icon into or out of the intersection area 308, a full set of the multimedia contents icons relating to that particular medium icon can be fully extended or retracted.

Although FIG. 3A shows the video icon 316 as the selected icon, other medium icons 312-314, 318-324 can be selected to process/view other types of multimedia contents. For example, the photo icon 312 can be selected when a stored image is to be processed or viewed. Thus, the contents icon array may include thumbnail icons of still images or small moving images taken with a digital camera. The music icon 314 can be selected when audio files are played or processed. The audio files are typically read in from the optical disk 110 in a specific compression format. Thus, the contents icon array may include thumbnail icons of songs or albums. Information such as a title of the song or album can be displayed adjacent to the selected icon. Other attributes that can be displayed include the duration of the song or album.

The TV icon 318 can be selected when a television program received from the TV line 106 is to be viewed or processed. Thus, the contents icon array may include thumbnail icons of broadcast channels and/or programs. Attributes of the television program such as a name/number of the broadcast channel, a title of the program, and a broadcast time can be displayed. The DVD icon 320 can be selected when video and/or audio stored on the optical disk 110 is to be viewed and/or listened to. When the optical disk 110 is recognized as a DVD, a legend "DVD" is displayed on the medium icon 320. Otherwise, when the optical disk is recognized as a CD, a legend "CD" is displayed on the medium icon 320. In one implementation, when a moving image is stored on the DVD or the CD, a thumbnail of a short video clip can be used as a contents icon. In another implementation, when music is stored on the DVD or the CD, a short audio clip of the music can be used as a contents icon.

The Web icon 322 can be selected when data from the Internet line 108 is to be processed or displayed. Thus in this case, the contents icon array may include thumbnail icons of Web sites or links. Attributes of the Web sites such as a URL of the Web site can be displayed adjacent to the selected icon. The game icon 324 can be selected when a game program is to be played or executed. Thus in this case, the contents icon array may include thumbnail icons of different game programs. Attributes of the game program such as a title of the game can be displayed adjacent to the selected icon.

In general, the thumbnail contents icons are still images representing the linked multimedia contents files. However, the thumbnail icons can be a sequence of animated images, which may provide better representation of the contents files. In one implementation, the contents icons are retrieved from data of the contents files (e.g., from thumbnail data stored with the contents data).

In FIG. 3A, when the video contents icon array 306 is in a fully extended mode, the array 306 includes eight visible video contents icons representing eight video contents files. In some implementations, the number of visible contents icons can be appropriately varied. Additional video contents icons representing other video contents files can be made visible by scrolling the icons up or down, as shown at 332. Similar to the medium icon processing, the effects processor 244 displays the video contents icons with the same display parameters while the icons are being scrolled. However, when a particular video contents icon 340 is positioned into an attention area 310, below the intersection area 308, the effects processor 244 changes the display parameters of the particular video contents icon 340 for easy viewing. In other implementations, the attention area 310 can be positioned at anywhere in the contents icon array 306.

The effects processor 244 enlarges the icon 340 when the icon is positioned into the attention area 310. The display parameters can include color, size, lightness, saturation, and/or hue. The display parameters can also include special effects, such as a flashing or blinking action. Further, when the video contents icon 340 is positioned into the attention area 310, attributes 350 associated with the icon 340 are displayed adjacent to the icon. For example, in one implementation, the attributes 350 can include a title and a recording date.

When the controller 114 provides a command/instruction to select a particular contents icon or thumbnail 340 (e.g., by entering a select or play command while the icon 340 is positioned in the attention area 310), the image generator 248 in the display control unit 204 removes the menu screen 302 from the display 300. Substantially simultaneously, the contents controller 246 in the display control unit 204 initiates the display of the contents file linked to the selected contents icon 340. In the illustrated implementation, the selected contents file is the Singing Quartet video.

Figure 4:
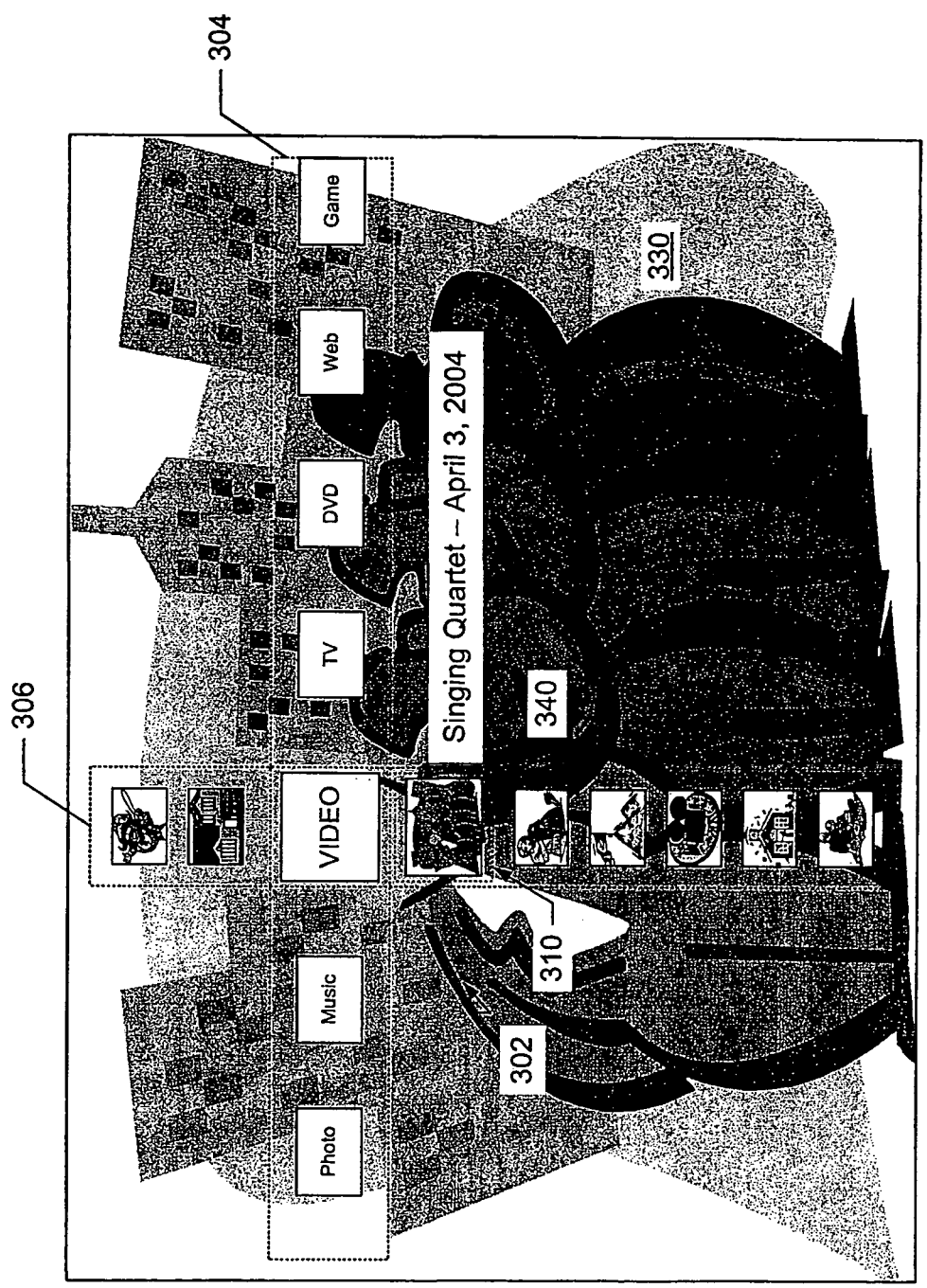
FIG. 4 shows the menu screen superimposed on top of the currently playing video associated with the selected video icon.

Once the selected video is playing, a command/instruction from the controller 114 to bring the menu screen 302 back up invokes the menu screen to be superimposed on top of the currently playing video, as shown in FIG. 4. The attention area 310 of the displayed menu screen 302 shows the video contents icon 340 of the currently playing video shown in the background 330. In the illustrated implementation of FIG. 4, the currently playing video shown in the background 330 is dimmed to highlight the menu screen 302.

Figure 5:
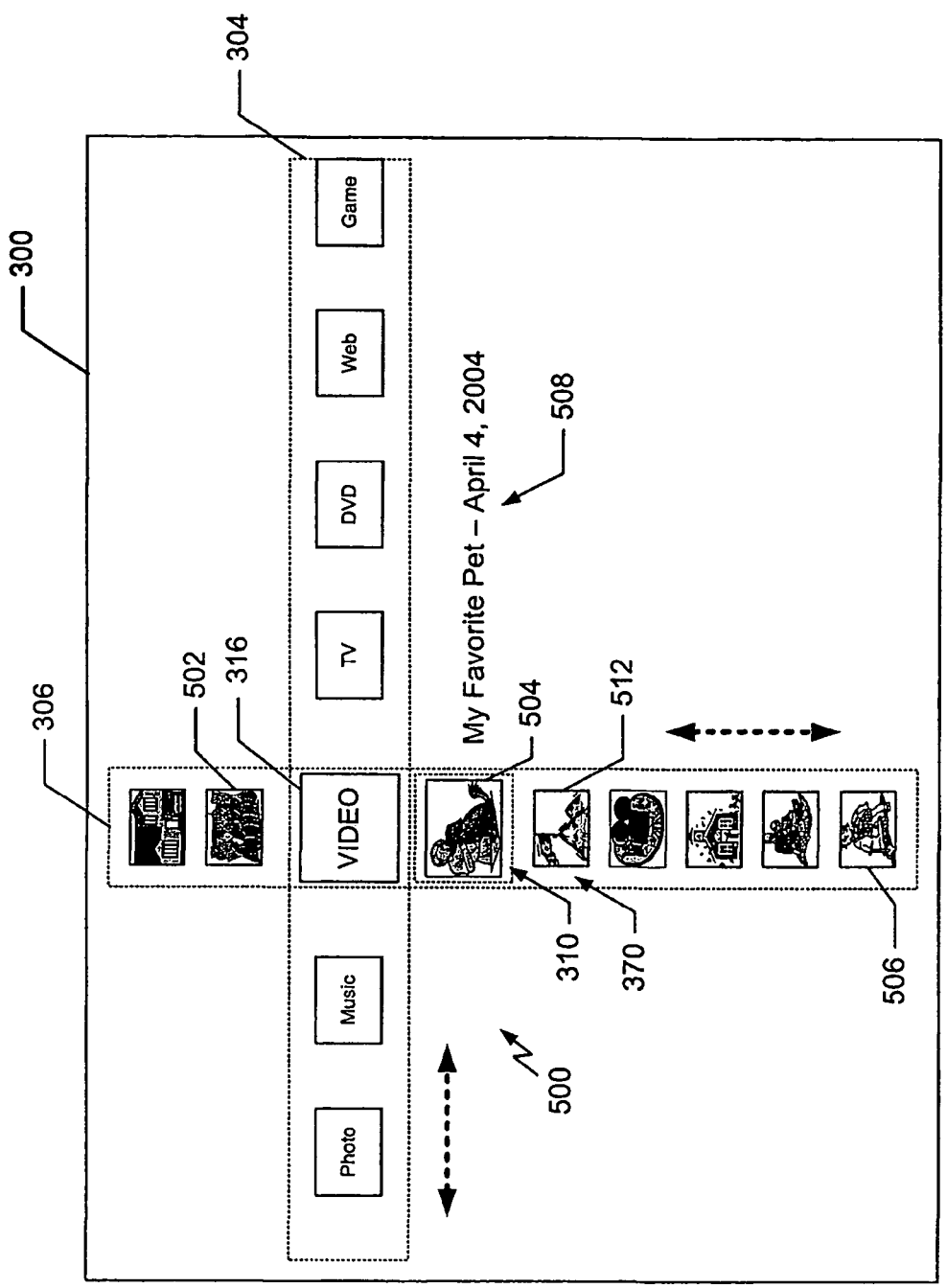
FIG. 5 shows one configuration of the menu screen when contents icons in a contents icon array are scrolled up from the configuration of FIG. 3A.

FIG. 5 shows one configuration of the menu screen 500 when the contents icons in the contents icon array 306 are scrolled up from the configuration of FIG. 3. Singing Quartet video icon 502 has now been moved up above the video medium icon 316. Furthermore, the size of the icon 502 has been changed to substantially similar dimensions as those of other contents icons in the contents icon array 306. However, My Favorite Pet video icon 504 has now been positioned in the attention area 310. Thus, the size of this icon 504 has been enlarged to enhance the viewing of the selected icon 504. All other contents icons in the contents icon array 306 have also been moved up one slot. The top icon 360 (in FIG. 3) has been moved out and the bottom icon 506 has been moved into the visible display 300. Again, the selection of the video icon 504 initiates access and execution of the video contents file linked to the video icon 504. The attributes for this video icon 504 are displayed at 508.

Figure 6:
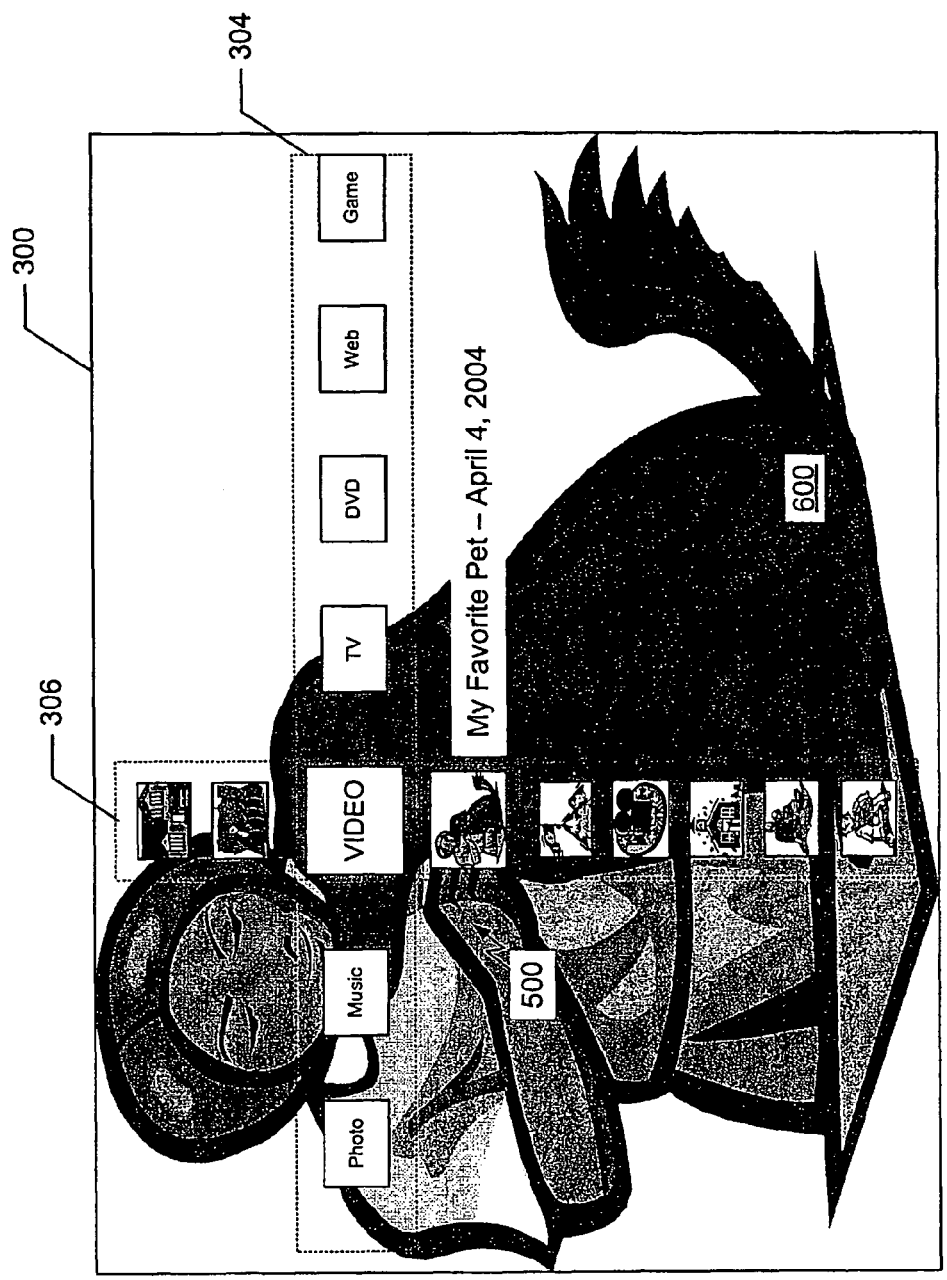
FIG. 6 illustrates one implementation of a viewing mode of a currently playing video.

FIG. 6 illustrates one implementation of a viewing mode of My Favorite Pet video 600 of the display 300, which is a result of the execution of the video contents file linked to the video icon 504. In the illustrated implementation, the viewing mode also includes the menu screen 500 superimposed on top of the video 600.

Referring again to FIG. 3A, the controller 114 provides user commands/instructions to move the contents icons within the contents icon array 306. The effects processor 244 receives the commands/instructions from the controller 114 and scrolls the contents icons up or down. Since the contents icons in the contents icon array 306 are organized in a circular database, every contents icon can be selected and displayed by the effects processor 244 by continuously scrolling in one direction. For example, although the thumbnail icon of an opera singer 360 is above the attention area 310 of the menu screen 302 in FIG. 6, the icon 360 can be moved into the attention area 310 by continuously scrolling up. Alternatively, the contents icons can be arranged in a linear list.

Since there may be a large number of contents icons in a contents icon array, searching through the contents icons can be a very time-consuming task. For example, a television/cable broadcast can have more than 500 channels. In this case, a selection of a television broadcast medium icon 318 will bring up more than 500 channel icons in the contents icon array. Thus, scrolling through all 500 channel icons could take a long time. Therefore, a typical GUI system may allow a user to input a command/instruction through the controller to scroll through these icons at a relatively high speed. However, as mentioned above, conventional GUI systems have had difficulties processing the icon images fast enough to scroll and visually smoothly display all the images.

Figure 7:
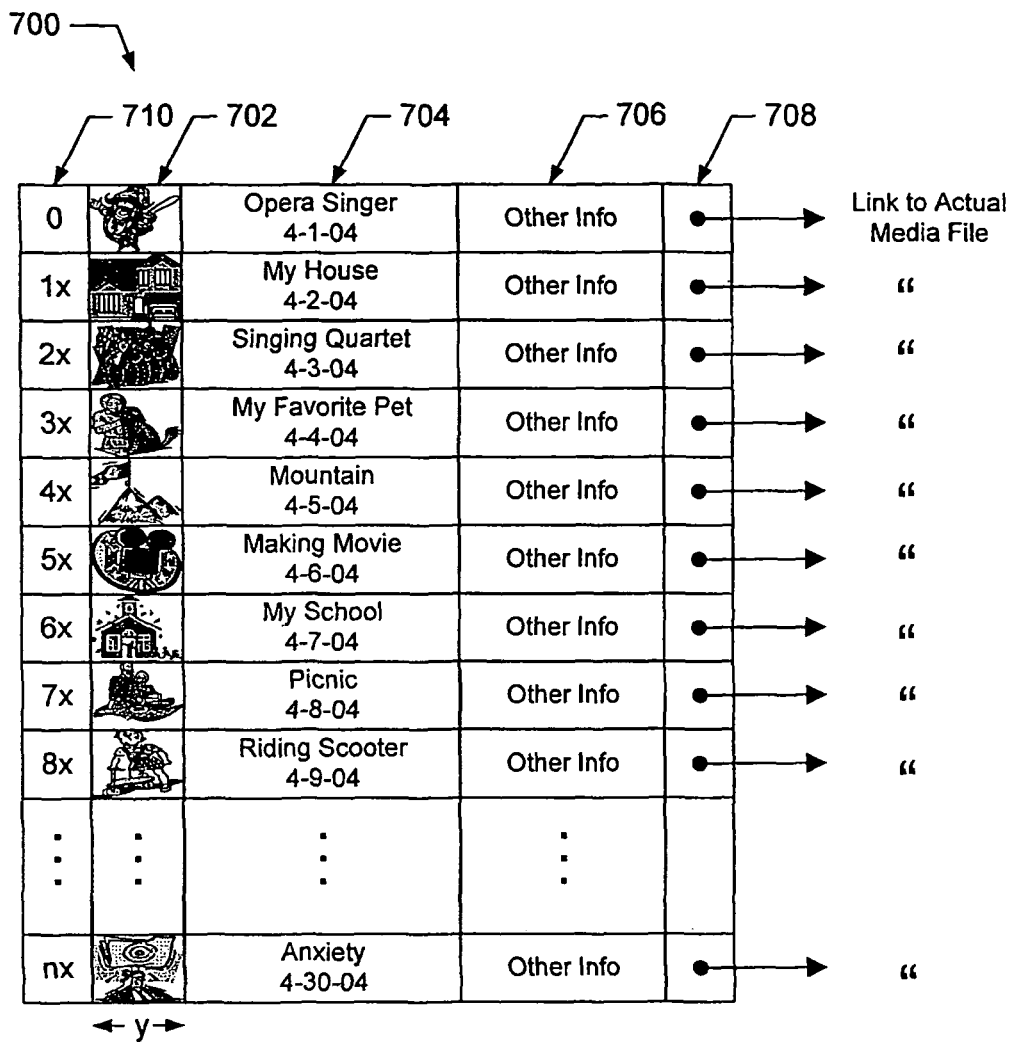
FIG. 7 illustrates one implementation of a multimedia contents icon database.

FIG. 7 illustrates one implementation of a multimedia contents icon database 700, which enables "fast" scrolling of contents icons in a GUI system. The term "fast" is also synonymous with terms such as "quickly" and "relatively high speed". The multimedia contents icon database 700 includes entries that correspond to contents icons in the contents icon array 306 of FIGS. 3A through 6. In one implementation, the term "fast" scrolling is meant to indicate a scroll speed that is fast enough to scroll and visually smoothly display the contents icons. For example, the term "fast" can indicate a scroll speed where the contents icons are scrolled without pausing to accommodate loading icon images.

In the illustrated implementation, each entry in the contents icon database 700 includes a thumbnail icon 702, title information 704, additional information 706, and a pointer 708. The thumbnail icon 702 is implemented as a single image that represents the actual video contents file. In another implementation, the thumbnail icon 702 can be implemented as a sequence of images that represents the video contents file. In a further implementation, the thumbnail icon 702 can be implemented as any metadata (e.g., audio or sound) that represents the video contents file. The title information 704 includes a title and a recording date of the video file. Typically, this information 704 is displayed next to the icon 702 on the menu screen when the icon 702 is selected. Additional information 706 includes other information related to the video file, such as comments about the file. The pointer 708 provides a link to the actual video contents file associated with the icon 702. When the icon 702 on the menu screen is selected, the actual video contents file is accessed using the pointer 708.

An entry in the database 700 has a starting address 710, as shown in FIG. 7. It can be seen that each entry is fixed in size (x). Furthermore, the size of the contents icon 702 can also be fixed (y). Similarly, the other fields can also have fixed sizes. Thus, when the user issues commands/instructions (using the controller) to the GUI to scroll up or down, the program running the GUI can update the display of a particular slot (e.g., slot 370 in FIG. 3) in the contents icon array by jumping to a next address in the database, which is a fixed amount (x) after the current address. The program can then access a fixed number of bytes (y) to display the next contents icon for the particular slot in the contents icon array.

In the illustrated implementation, the size of each entry is the same as other entries. In another implementation, the size of each entry may be a multiple of a fixed number (e.g., x). Thus, in this implementation, the multiple should be indicated at the beginning of each entry so that the program running the GUI can jump an appropriate amount to scroll the icon.

For example, slot 370 in FIG. 3 contains a video icon 372 entitled 'My Favorite Pet'. The display of this video icon 372 on the menu screen 302 by the GUI program is enabled by the contents icon database 700. The GUI program accesses the data for the video icon 372 by jumping to address '3x' and reading 'y' bytes from the database. When the user issues a command/instruction to scroll up, the menu screen 302 of FIG. 3 changes to the menu screen 500 of FIG. 5, where slot 370 now contains a video icon 512 entitled 'Mountain'. The display of this video icon 512 on the menu screen 500 by the GUI program is again enabled by the contents icon database 700. The GUI program accesses the data for the video icon 512 by jumping to next address '4x' and reading 'y' bytes from the database. Thus, the GUI program can use multiples of fixed database addresses to access appropriate icons without traversal. The GUI program scrolls through 'n' number of contents icons before jumping back up to the top of the database 700.

In some implementations, the database 700 can be implemented using a cache (e.g., high speed dedicated memory) and configured as described below. A plurality of icons (e.g., 128 icons) is retrieved from the database 700 and stored in the cache memory. In this example, the GUI program can provide fast scrolling because the retrieval operation involves the program calculating the size of the retrieval by simply multiplying the number of icons (128) by the fixed size of each icon (e.g., x bytes) and accessing the product of two numbers (e.g., 128x bytes) from the database. Therefore, by keeping the size of each entry as a fixed number (e.g., x), cache update can be performed relatively quickly to provide fast scrolling.

Fast scrolling can be further enhanced by overwriting the cache without updating the database unless changes are specifically made to the cache. That is, by updating the cached data in the database only when the changes are made, relatively slow memory operations for writing to the database can be avoided.

Figure 8:
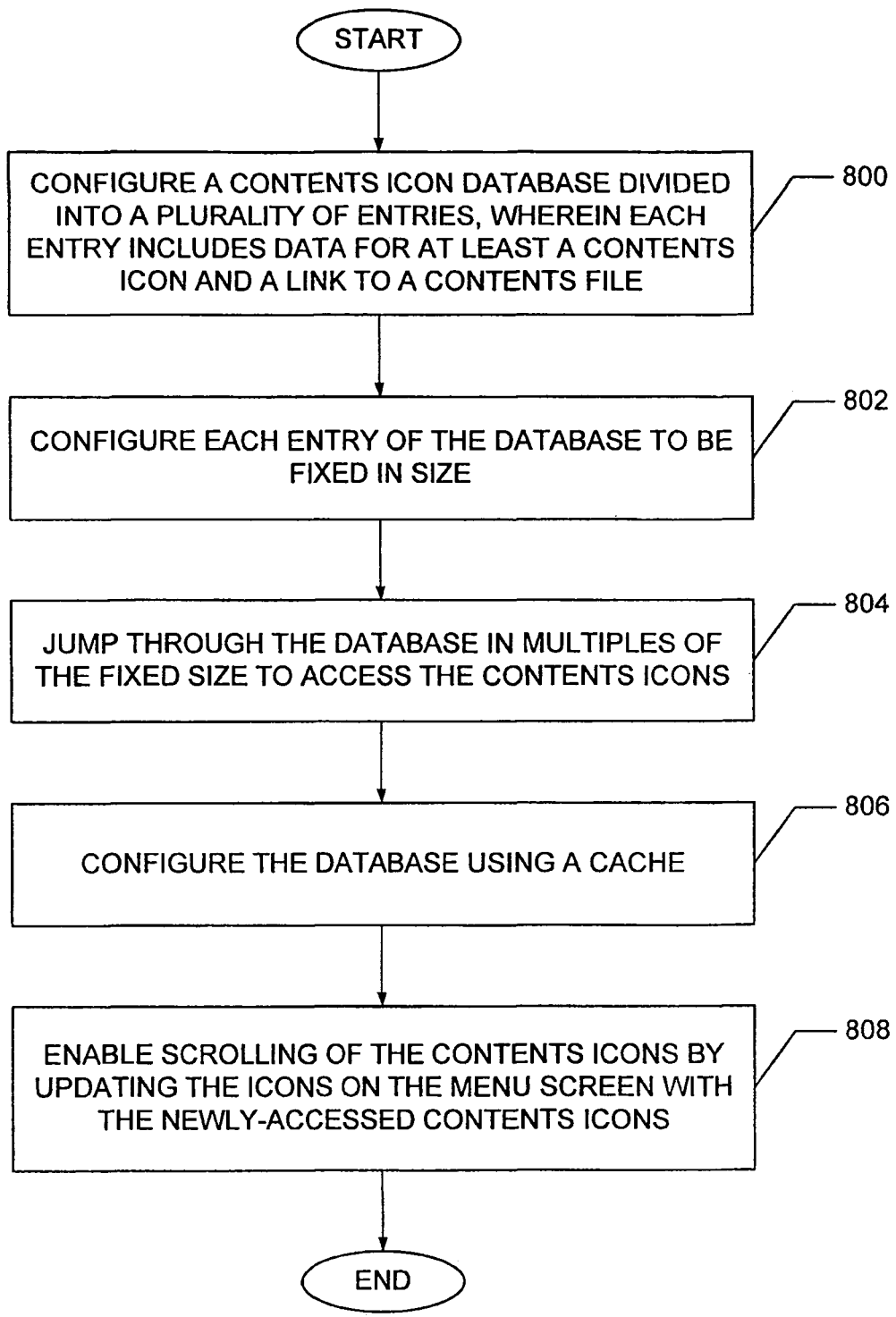
FIG. 8 is a method for enabling fast scrolling in a GUI illustrated as a flowchart.

FIG. 8 is a method for enabling fast scrolling in a GUI illustrated as a flowchart. In the illustrated implementation, a contents icon database 700 is configured at 800. The database 700 is divided into a plurality of entries, wherein each entry includes data for at least a contents icon and a link to a contents file associated with the contents icon. At 802, each entry of the database 700 is configured to be fixed in size. In one implementation, the size of each entry is the same as other entries. In another implementation, the size of each entry may be a multiple of the fixed number. Thus, in this implementation, the multiple should be indicated at the beginning of each entry so that the program running the GUI can jump appropriate amount to scroll the icon. The GUI jumps through the database 700, at 804, in multiples of the fixed number to access the contents icons.

The fast scrolling can be further enabled by configuring the database with a cache, at 806. The data retrieval operation in a cache configuration involves the GUI program calculating the size of the retrieval by multiplying the number of icons to be retrieved by the fixed size of each icon. The product of two numbers (i.e., the number of icons multiplied by the fixed size) is then retrieved from the database. Therefore, by keeping the size of each entry as a fixed number (e.g., x), cache update can be performed relatively quickly to provide fast scrolling. As mentioned above, the fast scrolling can be further enhanced by flushing and overwriting the cache without updating the database unless changes are specifically made to the cache. The GUI enables the scrolling of the contents icons by updating the icons on the menu screen with the newly accessed contents icons, at 808.

Various implementations of the invention are realized in electronic hardware, computer software, or combinations of these technologies. Most implementations include one or more computer programs executed by a programmable computer. For example, in one implementation, the system for enabling fast scrolling of contents icons in a GUI includes one or more computers executing software implementing the fast scrolling and database configuration discussed above. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Although various illustrative implementations of the present invention have been described, one of ordinary skill in the art will see that additional implementations are also possible and within the scope of the present invention. For example, while the database shown in FIG. 7 is implemented for contents icons, the database implementation is equally applicable to a medium icon database having entries corresponding to medium icons to enable fast scrolling of medium icons in a GUI system.

Accordingly, the present invention is not limited to only those implementations described above.

What is claimed is:

1. A method of moving objects in a graphical user interface, comprising:
   obtaining a video image of a user of the interface with an image capture device that the user faces while facing a display;
   displaying a mirror image of the video image on the display such that the video image is superposed with one or more objects displayed on the display; and
   moving one or more objects displayed on the display based on recognition of motions of the mirror image of the video image of the user, wherein moving the one or more objects includes, determining whether the user's arm crosses the user's chest, determining whether the user is using the user's left or right hand to select or move the one or more objects, determining a relative location of an image of the user's hand relative to an image of the user's head, and positioning the one or more objects differently relative to the user's head in the mirror image depending on whether the user's left hand or right hand is used to move or select the one or more objects and whether the user's arm crosses the user's chest.

2. The method of claim 1 wherein recognition of motions of the video image includes recognition of motions of an image of the user's hand or an object held in the user's hand.

3. The method of claim 2 wherein recognition of motions of an image of the user's hand or an object held in the user's hand include recognition of a change in aspect ratio of the image of the user's hand or an object held in the user's hand.

4. The method of claim 1 wherein recognition of motions of the video image includes recognizing a change in aspect ratio of a user's hand or an object held within the user's hand.

5. The method of claim 1 wherein the one or more objects includes a plurality of contents icons.

6. The method of claim 5, further comprising receiving a voice command to select one or more icons from the plurality of contents icons.

7. The method of claim 6, wherein receiving a voice command to select one or more icons from the contents icon array includes displaying a list of selected content icons based on a keyword in the voice command.

8. The method of claim 7 wherein receiving a voice command includes the use of a device having one or more microphones attached to a video image capture device.

9. The method of claim 5 wherein moving one or more objects includes receiving a command to scroll and/or select one or more contents icons of the plurality of contents icons displayed on display; and retrieving an appropriate number of additional contents icons from a contents icon database to provide a scrolled display in the graphical user interface,
wherein the contents icon database is divided into a plurality of entries, each entry of the plurality of entries including at least data for a contents icon of the plurality of contents icons and a link to a contents file, each entry of the database is configured to be fixed in size so that the data for the contents icon can be quickly accessed, and the contents icon can be scrolled in the graphical user interface at a relatively high speed.

10. The method of claim 9, wherein the relatively high speed indicates a scroll speed where the contents icons are scrolled without pausing to accommodate loading icon images to scroll and visually smoothly display the contents icons in the graphical user interface.

11. The method of claim 9, wherein configuring each entry to be fixed in size includes configuring every entry of the plurality of entries to be a particular size.

12. The method of claim 11, wherein the database has a cache for storing data from the database.

13. The method of claim 12, further comprising retrieving a first plurality of entries from the database and storing the entries in the cache.

14. The method of claim 13, further comprising
retrieving a second plurality of entries from the database; and
overwriting data in the cache with the second plurality of entries without updating the first plurality of entries in the database unless a change has been made to at least one entry of the first plurality of entries stored in the cache.

15. The method of claim 5, wherein the contents icon includes a thumbnail image representative of data in the contents file.

16. The method of claim 1, wherein the contents icon includes a sequence of thumbnail images representative of data in the contents file.

17. The method of claim 16, wherein the sequence of thumbnail images forms an animation sequence.

18. The method of claim 1, further comprising configuring the contents icon in every entry of the plurality of entries to be a particular size.

19. The method of claim 1, wherein the graphical user interface includes a menu screen for a multimedia processing system.

20. The method of claim 19, wherein the menu screen is configured as a series of icon arrays.

21. The method of claim 20, wherein configuring a series of icon arrays includes arranging a medium icon array in a horizontal direction.

22. The method of claim 21, wherein the medium icon array includes a plurality of medium icons.

23. The method of claim 22, wherein the plurality of medium icons includes a photograph icon, a music icon, a moving image icon, a broadcast icon, an optical disk icon, a web icon, and a game icon.

24. The method of claim 16, wherein the medium icon array includes an intersection area.

25. The method of claim 24, wherein configuring a series of icon arrays includes arranging a contents icon array in a vertical direction for a particular medium icon that is scrolled into the intersection area.

26. The method of claim 25, wherein the contents icon array includes a plurality of contents icons and an attention area.

27. The method of claim 26, further comprising accessing the contents file of a contents icon scrolled into the attention area, wherein the contents file is accessed using the link in a database entry of the contents icon scrolled into the attention area.

28. The method of claim 27, wherein the database is stored in a multimedia processing apparatus.

29. The method of claim 1, wherein the graphical user interface is implemented in a multimedia processing apparatus.

30. The method of claim 29 wherein the multimedia processing apparatus is a game console, television, digital video recorder (DVR), cable set-top-box, home media server or consumer electronic device.

31. A computer program, stored in a non-transitory storage medium, for
moving objects in a graphical user interface, the program comprising executable instructions that cause a computer to:
obtain a video image of a user of the interface;
display a mirror image of the video image of the user on a display;
determine whether a user's arm crosses a user's chest; and
based on recognition of motions of the mirror image of the video image of the user, moving one or more objects displayed in the graphical user interface, wherein moving the one or more objects includes determining whether the user is using the user's left or right hand to select or move the one or more objects, determining a relative location of an image of the user's hand relative to an image of the user's head, and positioning the one or more objects differently relative to the user's head in the mirror image depending on whether the user's left hand or right hand is used to move or select the one or more objects and whether the user's arm crosses the user's chest.

32. The method of claim 31, wherein moving one or more objects displayed in the graphical user interface includes scrolling a plurality of contents icons displayed in the graphical user interface.

33. The method of claim 32, further comprising retrieving an appropriate number of additional contents icons from a contents icon database to provide a scrolled display in the graphical user interface,
wherein the contents icon database is divided into a plurality of entries, each entry of the plurality of entries including at least data for a contents icon of the plurality of contents icons and a link to a contents file, each entry of the database is configured to be fixed in size so that the data for the contents icon can be quickly accessed, and the contents icon can be scrolled in the graphical user interface at a relatively high speed.

34. A multimedia processing apparatus, comprising:
a video image capture device adapted to capture a real-time video image of a user of a graphical user interface;
a display adapted to show the medium icon array and the contents icon array superposed over a mirror image of the image of the user; and
a display control that allows the user to move one or more objects shown in the graphical user interface based on motions of the mirror image of the image of the user, wherein the display control is configured to determine whether the user's arm crosses the user's chest, determine whether the user is using the user's left or right hand to select or move the one or more objects, determine a relative location of an image of the user's hand relative to an image of the user's head, and position the one or more objects differently relative to the user's head in the mirror image depending on whether the user's left hand or right hand is used to move or select the one or more objects and whether the user's arm crosses the user's chest.

35. The multimedia apparatus of claim 34 wherein the display controller is configured to recognize of motions of an image of the user's hand.

36. The multimedia apparatus of claim 35 wherein the display controller is configured to recognize a change in aspect ratio of the image of the user's hand.

37. The multimedia apparatus of claim 35 wherein the display controller is configured to recognize a change in aspect ratio of a user's hand or an object held within the user's hand.

38. The apparatus of claim 34 wherein the video image capture device includes a digital camera.

39. The apparatus of claim 34, further comprising one or more microphones coupled to the display control to manipulate the medium icon array and/or the content icon array by voice commands.

40. The apparatus of claim 34, further comprising a memory configured as a contents icon database, including
 a plurality of entries including data for a plurality of contents icons and links to multimedia contents,
  wherein each entry of said plurality of entries is fixed in size such that the plurality of contents icons can be quickly accessed to allow the contents icons to be scrolled in a graphical user interface at a relatively high speed; and
 a processor configured to load the plurality of contents icons to allow a user to scroll and select a particular contents icon from the plurality of contents icons.

41. The multimedia processing apparatus of claim 34, wherein the graphical user interface includes a menu screen for a multimedia processing apparatus.

42. The multimedia processing apparatus of claim 41, wherein the menu screen is configured as a series of icon arrays.

43. The multimedia processing apparatus of claim 42, wherein the series of icon arrays includes a medium icon array arranged in a horizontal direction.

44. The multimedia processing apparatus of claim 43, wherein the medium icon array includes a plurality of medium icons.

45. The multimedia processing apparatus of claim 44, wherein the plurality of medium icons includes a photograph icon, a music icon, a moving image icon, a broadcast icon, an optical disk icon, a web icon, and a game icon.

46. The multimedia processing apparatus of claim 43, wherein the medium icon array includes a center area.

47. The multimedia processing apparatus of claim 46, wherein the series of icon arrays includes a contents icon array arranged in a vertical direction for a particular medium icon that is scrolled into the center area.

48. The multimedia processing apparatus of claim 47, wherein the contents icon array includes a plurality of contents icons and an attention area.

49. The multimedia processing apparatus of claim 48, wherein the links in the plurality of entries are used to access multimedia contents of a contents icon scrolled into the attention area.

50. The multimedia processing apparatus of claim 34, wherein the multimedia processing apparatus is a game console, television, digital video recorder (DVR), cable set-top-box, home media server or consumer electronic device.

51. The method of claim 1 wherein the video image is obtained with a single video image capture device.

* * * * *